United States Patent
Numaoka

(12) 
(10) Patent No.: US 8,732,471 B2
(45) Date of Patent: May 20, 2014

(54) DATA COMMUNICATION METHOD, COMPUTER AND INFORMATION STORING MEDIUM

(75) Inventor: Chisato Numaoka, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1443 days.

(21) Appl. No.: 12/092,491

(22) PCT Filed: Aug. 2, 2006

(86) PCT No.: PCT/JP2006/315336
§ 371 (c)(1), (2), (4) Date: Jun. 19, 2008

(87) PCT Pub. No.: WO2007/055054
PCT Pub. Date: May 18, 2007

(65) Prior Publication Data
US 2009/0125721 A1 May 14, 2009

(30) Foreign Application Priority Data
Nov. 8, 2005 (JP) ................. 2005-323322

(51) Int. Cl.
*G06F 21/00* (2013.01)
*H04L 9/32* (2006.01)

(52) U.S. Cl.
CPC ............ *H04L 9/3263* (2013.01); *H04L 9/3273* (2013.01)
USPC ............ 713/175; 713/150; 713/168; 713/170

(58) Field of Classification Search
CPC ............................. H04L 9/3263; H04L 9/3273
USPC ................................. 713/175, 150, 168, 170
See application file for complete search history.

(56) References Cited

U.S. PATENT DOCUMENTS

| | | | |
|---|---|---|---|
| 7,185,363 B1 * | 2/2007 | Narin et al. | 726/6 |
| 7,272,656 B2 * | 9/2007 | Miyoshi | 709/230 |

(Continued)

FOREIGN PATENT DOCUMENTS

| | | |
|---|---|---|
| JP | 2000148705 | 5/2000 |
| JP | 2002342299 | 11/2002 |

OTHER PUBLICATIONS

Needham et al.; Using encryption for authentication in large networks of computers; Dec. 1978; Communications of the ACM; vol. 21 Issue 12, Dec. 1978; pp. 993-999.*

(Continued)

*Primary Examiner* — Bradley Holder
(74) *Attorney, Agent, or Firm* — Katten Muchin Rosenman LLP

(57) ABSTRACT

A computer including at least two processors is used to preferably perform a secure data communication. Data containing a processor ID identifying one of the at least two processors provided for a first computer (computer 31) is transmitted from the first computer to a second computer (a node at the other party) (S91, S92). The second computer returns data containing the processor ID contained in the data transmitted in S91 and S92 and a public key certificate relating to the second computer. The first computer receives the data returned from the second computer, acquires, from the received data, the processor ID contained therein, and causes a processor (SPE1), which is identified by the processor ID, to process the received data. At this moment, the processing of the data is restricted according to a content of the public key certificate contained in the received data.

6 Claims, 20 Drawing Sheets

(56) References Cited

U.S. PATENT DOCUMENTS

| | | | |
|---|---|---|---|
| 7,376,975 B2* | 5/2008 | Lafornara et al. | 726/27 |
| 7,991,694 B2* | 8/2011 | Takayama | 705/41 |
| 2001/0037435 A1* | 11/2001 | Van Doren | 711/153 |
| 2001/0042225 A1* | 11/2001 | Cepulis et al. | 714/25 |
| 2002/0062451 A1* | 5/2002 | Scheidt et al. | 713/201 |
| 2002/0152373 A1 | 10/2002 | Sun et al. | |
| 2002/0165912 A1* | 11/2002 | Wenocur et al. | 709/203 |
| 2002/0199103 A1* | 12/2002 | Dube | 713/168 |
| 2003/0074570 A1* | 4/2003 | Miyoshi | 713/190 |
| 2003/0126233 A1 | 7/2003 | Bryers et al. | |
| 2003/0159043 A1* | 8/2003 | Epstein | 713/176 |
| 2006/0075254 A1* | 4/2006 | Henniger | 713/184 |
| 2009/0125429 A1* | 5/2009 | Takayama | 705/35 |

OTHER PUBLICATIONS

Wong et al.; Mutual authentication and key exchange for low power wireless communications; 2001; Military Communications Conference, 2001. MILCOM 2001. Communications for Network-Centric Operations: Creating the Information Force. IEEE (vol. 1); pp. 39-43 vol. 1.*

English translation of the International Preliminary Report on Patentability and the Written Opinion of the International Searching Authority dated May 14, 2008, from the corresponding International Application.

International Search Report dated Sep. 19, 2006 from PCT/JP06/315336.

Extended European Search Report, dated Feb. 18, 2014, from corresponding European Patent Application No. 06782205.6.

Chou W: "Inside SSL: the secure sockets layer protocol", IT Professional, IEEE Service Center, Los Alamitos, CA, US, vol. 4, No. 4, Jul. 1, 2002, pp. 47-52, XP011095195, ISSN: 1520-9202, DOI: 10.1109/MITP.2002.1046644 * pp. 51-52 *.

* cited by examiner

FIG.1

| LAYER | MAJOR PROTOCOLS | OTHER PROTOCOLS |
|---|---|---|
| APPLICATION LAYER | SMTP, HTTP | POP, IMAP, TELNET, FTP, TFTP, NNTP |
| TRANSPORT LAYER | TCP | UDP |
| NETWORK LAYER | IP | DHCP, RIP, OSPF, ARP, BGP4 |
| DATA LINK LAYER | ETHERNET (REGISTERED TRADEMARK), PPP | HDLC, PIAFS, SLIP |
| PHYSICAL LAYER | ETHERNET MODEM, TA | AppleTalk (REGISTERED TRADEMARK) |

FIG.9

| PEER NODE ID | PUBLIC KEY CERTIFICATE STORAGE LOCATION | IP ADDRESS | RESPONSE |
|---|---|---|---|
| 0001 | LOC23 | 192.168.5.20 | OK |
| 0002 | LOC18 | 192.168.40.120 | NO |
| 0003 | LOC5 | 192.168.0.8 | OK |
| 0004 | LOC83 | 192.168.56.1 | OK |
| ⋮ | ⋮ | | ⋮ |

65

DATA COMMUNICATION METHOD, COMPUTER AND INFORMATION STORING MEDIUM

TECHNICAL FIELD

The present invention relates to a data communication method, a computer, and an information storing medium, and more particularly, to a data communication by computers including at least two processors.

BACKGROUND ART

A conventional data communication protocol assumes that, when one computer includes only one processor, this one processor serves as a representative to communicate with another computer, and when one computer includes multiple processors, one of the multiple processors serves as a representative to communicate with another computer.

When two computers carry out a secure communication therebetween, usually, a user of one computer and a user of the other computer exchange public key certificates (electronic certificates) to carry out the secure communication, or the computers use the secure socket layer (SSL) (or transport layer security (TLS)), a client computer obtains a public key accompanying a public key certificate from a server computer, and then, they secretly share a common key generated on one of them, thereby realizing a secure data communication between the client and the server.

DISCLOSURE OF THE INVENTION

Problems to be Solved by the Invention

According to the SSL (or TLS), by providing the SSL layer between the transport layer and the application layer of the Internet protocol, data is exchanged. This method is enough for a case where the number of the processors representing a computer is only one, but this method is insufficient for a case where two or more processors built into a one-chip processor each carry out a communication with external computers, which requires a mutual authentication.

The present invention is devised in view of the foregoing problem, and has an object to provide a data communication method, a computer, and an information storing medium which preferably enable a secure data communication by a computer including at least two processors.

Means for Solving the Problem

In order to solve the problem, according to the present invention, there is provided a data communication method between a first computer and a second computer each including at least two processors, including: a transmission step of transmitting, from the first computer to the second computer, data containing a processor ID identifying one of the at least two processors provided for the first computer; a reply step of returning, from the second computer to the first computer, data containing the processor ID contained in the data transmitted in the transmission step and a public key certificate relating to the second computer; a reception step of, on the first computer, receiving the data returned from the second computer; an acquisition step of, on the first computer, acquiring the processor ID contained in the data received in the reception step; a processing step of, on the first computer, causing the processor, which is the one of the at least two processors provided for the first computer, and is identified by the processor ID acquired in the acquisition step, to process the data received in the reception step; and an authentication step of, on the first computer, restricting the processing in the processing step according to a content of the public key certificate contained in the data received in the reception step.

According to the present invention, the first computer transmits the data containing the processor ID to the second computer, and the second computer returns the data containing this processor ID. Then, the first computer causes the processor identified by the processor ID contained in the received data to process the received data. On this occasion, the received data contains the public key certificate relating to the second computer, and the first computer restricts the data processing according to a content of this public key certificate. According to the present invention, since a communication in which a processor is identified is carried out, and data processing can be restricted according to a content of a public key certificate, a secure data communication can be carried out more preferably by a computer including at least two processors.

Further, according to an aspect of the present invention, the transmission step includes transmitting data further containing, in addition to the processor ID identifying the one of the at least two processors provided for the first computer, a public key certificate relating to the processor identified by the processor ID, and the reply step includes returning the data containing the processor ID contained in the data transmitted in the transmission step and the public key certificate relating to the second computer according to a content of the public key certificate contained in the data transmitted in the transmission step. Consequently, according to the content of the public key certificate, if the second computer determines that a trust relationship with the first computer cannot be built, the second computer can restrict the return of the data to the first computer.

Note that, the transmission step may include transmitting data, which contains the processor ID identifying the one of the at least two processors provided for the first computer as at least a part of a header, and a communication content as a payload, to the second computer.

Further, the reply step may include transmitting data, which contains the processor ID contained in the data transmitted in the transmission step and the public key certificate relating to the second computer as at least a part of the header, and a communication content as a payload, to the first computer.

Further, a computer according to the present invention includes: at least two processors; data transmission means for transmitting data containing a processor ID identifying one of the at least two processors to another computer; data reception means for receiving data containing the processor ID identifying the one of the at least two processors, and a public key certificate from the another computer; processor ID acquisition means for acquiring the processor ID contained in the data received by the data reception means; data processing means for causing the processor, which is the one of the at least two processors, and is identified by the processor ID acquired by the processor ID acquisition means, to process the data received by the data reception means; and authentication means for restricting the processing by the data processing means according to a content of the public key certificate contained in the data received by the data reception means.

Further, according to the present invention, there is provided an information storing medium storing a program executed by a computer including at least two processors, the program controlling the computer to function as: data transmission means for transmitting data containing a processor ID identifying one of the at least two processors to another computer; data reception means for receiving data containing the processor ID identifying the one of the at least two processors, and a public key certificate from the another computer; processor ID acquisition means for acquiring the processor ID contained in the data received by the data reception means; data processing means for causing the processor, which is the one of the at least two processors, and is identified by the processor ID acquired by the processor ID acquisition means, to process the data received by the data reception means; and authentication means for restricting the processing by the data processing means according to a content of the public key certificate contained in the data received by the data reception means. This program may be stored in a computer-readable information storing medium such as a CD-ROM and a DVD-ROM. Moreover, the computer includes a home game machine, an arcade game machine, a portable game machine, a cellular phone, a portable information terminal, a personal computer, and a server computer.

BRIEF DESCRIPTION OF THE DRAWINGS

FIG. 1 shows an example of a protocol stack used for a data communication.

FIG. 9 shows a configuration example of a peer node access table for the case where one sub-processor carries out authentication with multiple peer nodes.

BEST MODE FOR CARRYING OUT THE INVENTION

A detailed description will now be given of an embodiment of the present invention with reference to the drawings.

FIG. 1 shows a stack of communication protocols, and, as shown in this diagram, a data communication is carried out according to protocols each belonging to the physical layer, the data link layer, the network layer, the transport layer, and the application layer. The protocols of the respective layers are hierarchically arranged, and examples of them are shown in this diagram. This embodiment, in order to realize a secure data communication by a computer provided with a one-chip multi-core processor, defines a communication protocol located between the transport layer and the application layer.

Figure 2:
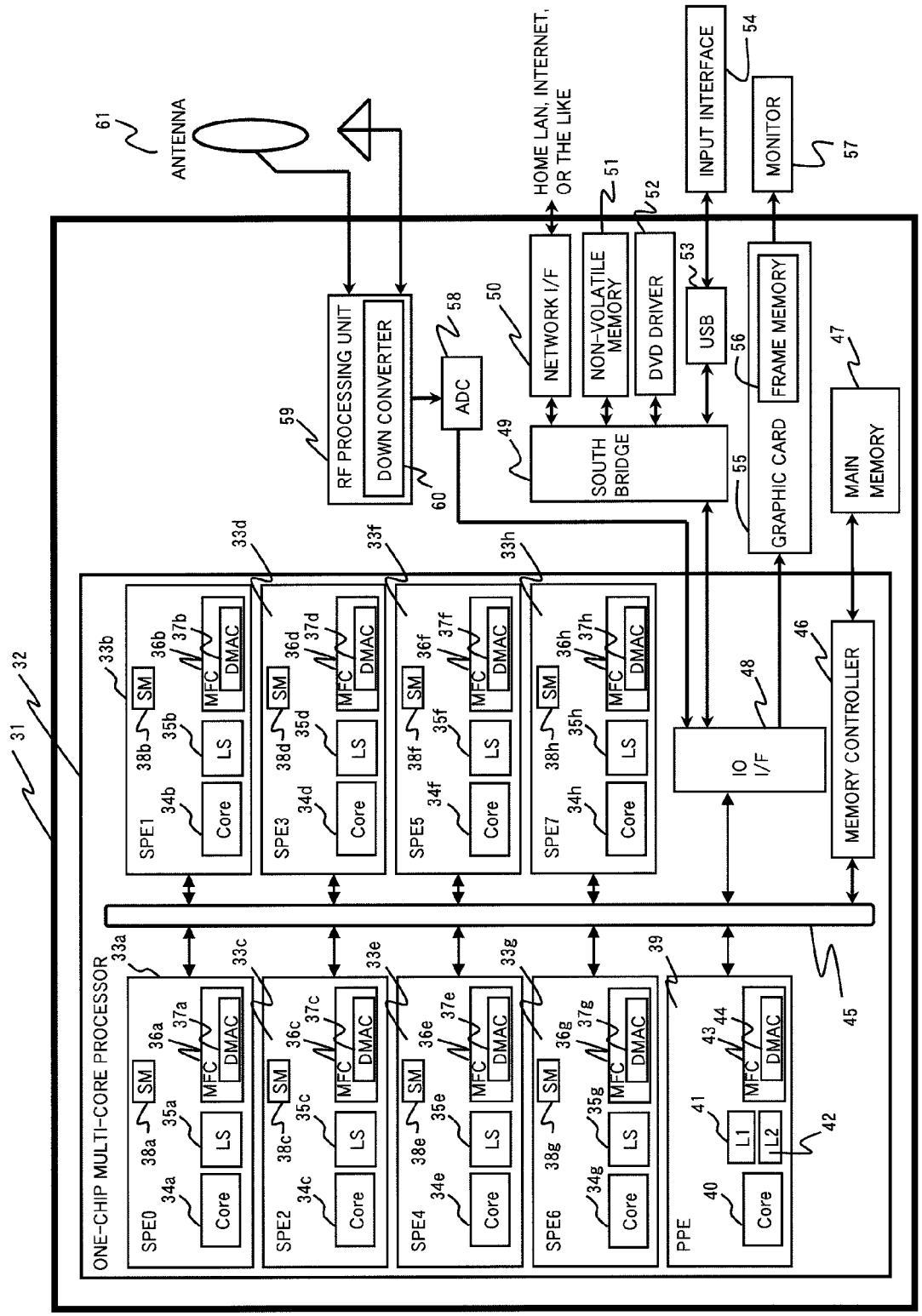
FIG. 2 is a hardware configuration diagram of a computer according to an embodiment of the present invention.

FIG. 2 is a system configuration example of a computer used for a data communication method according to this embodiment. One of characteristics of this computer 31 is that the computer 31 includes a one-chip multi-core processor 32. This one-chip multi-core processor 32 is configured so that a total of eleven processing elements (information processing means), which are a main processor 39 including a processor core 40, sub-processors 33a to 33h including a processor core 34, an I/O interface 48, and a memory controller 46, are connected to a ring bus 45, and operate in parallel. Moreover, the respective processing elements are uniquely recognized (identified) on the ring bus 45 by means of an ID such as "SPE1", and according to this ID, it is possible to identify which element is issuing a request to which element via the ring bus 45.

The memory controller 46 is connected to the main memory 47 to intermediate an access made by the respective processing elements to the main memory 47. Note that, in FIG. 2, the main memory 47 is illustrated outside the one-chip multi-core processor 32, but a configuration where the main memory 47 is contained inside the one-chip multi-core processor 32 may be provided. To the I/O interface 48, by connecting a south bridge 49 used to connect various I/O devices (such as a network interface 50, a non-volatile memory 51, a DVD driver 52, and an input interface 54 such as a keyboard connected to a USB port 53), a graphics card 55 which is provided with a frame memory 56, and controls display output to a monitor 57, an RF processing unit 59 which enables a wireless communication by means of an antenna 61, and the like, the main processor 39 and the sub-processors 33 can control external devices, and exchange data via communications with the external devices. This system is connected to a data communication network via the network interface 50, and the main processor 42 and the sub-processors 33 can independently communicate with various devices on the network. Moreover, a received signal acquired by the RF processing unit 59 is subjected to a frequency conversion by a down converter 60, and is converted by an A/D converter 58 into digital data, and, then is supplied to the I/O interface 48.

The sub-processors 33 each include a core 34, a local storage (LS) 35, a memory flow controller (MFC) 36 containing a direct memory access controller (DMAC) 37, and a secure memory 38 containing a secret key as components.

The secure memory 38 is a memory means such as a RAM, which is exclusively accessed by the core 34 (that is, only by the core 34 provided in the same sub-processor 33 as that in the secure memory 38). As shown in FIG. 3A, the secure memory may be a part of the local storage (LS) 35, or as shown in FIG. 3B, the secure memory may be independent as dedicated hardware (memory means such as a RAM accessed exclusively by the core 34). In this case, the dedicated hardware may be a non-volatile memory or a volatile memory. Moreover, as shown in FIGS. 3A and 3B, the local storage (LS) 35 holds a public key 63, a public key certificate 64 which indicates that the public key 63 is certified by a third party organization, and a peer node access table 65 holding information relating to access to external peer nodes (such as addresses).

Since the respective sub-processors 33 have the own local storage 35, once a program is loaded on the local storage 35, the sub-processor 33 can continue processing without making an access to the main memory 47 as long as necessity does not arise subsequently.

The main processor 39 contains a core 40, an L1 cache, an L2 cache, and an MFC 43 containing a DMAC 44 as components. In general, the operating system operates on the main processor 39, and, based on base processes of the operating system, programs which operate on the respective sub-processors 33 are determined. Needless to say, the program operating on the sub-processor 33 may be a program constituting a part of the operating system in a general sense (such as a device driver or a part of a system program). Moreover, the main processor 39 and the sub-processors 33 respectively have an instruction set architecture (ISA) including different instruction sets.

One of characteristics of the data communication method according to this embodiment is that the respective sub-processors 33 execute a process which carries out a mutual authentication with a peer node on the network. It should be noted that the peer node may provide a function as a server or a client. As a simplest example, with reference to FIGS. 4 and 5, a description will be given of a case where the respective sub-processors 33 uniquely establish a trust relationship with one peer node on the network. On this occasion, distributed processing for a data search by multiple computers is taken as an example.

Figure 4:
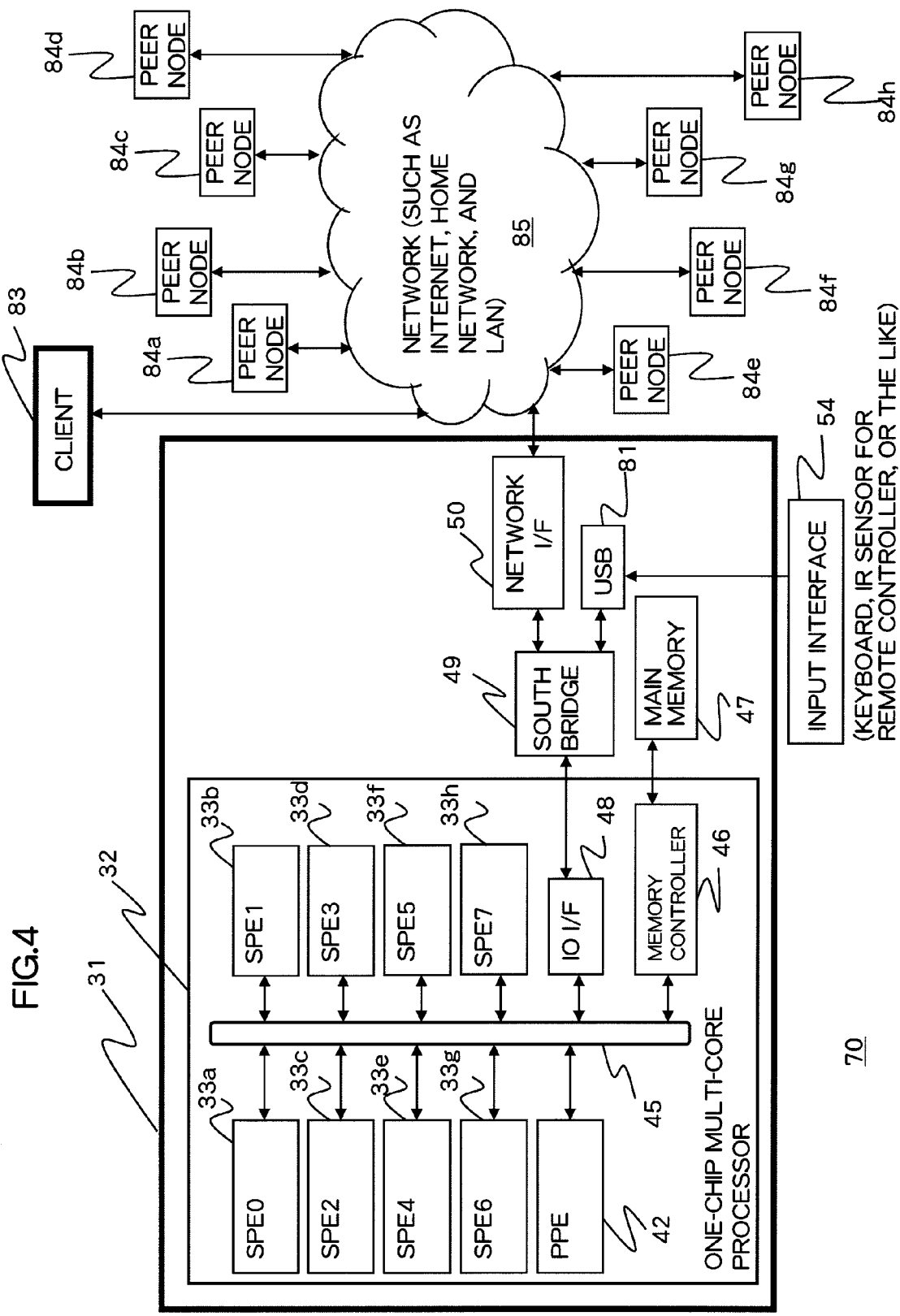
FIG. 4 shows an example of a data communication system.

As shown in FIG. 4, on a data communication system 70 used as the search system, the sub-processors 33 and peer nodes 84a to 84h respectively store at least one secret key. On the network 85, there exists a public key certificate authority, which is not shown in FIG. 4. The sub-processors 33 and the respective peer nodes 84 are provided with a public key certificate (electronic certificate) by the public key certificate authority based on the respective public keys 63. In other words, based on the public key 63 of the sub-processor 33, the public key certificate authority issues the public key certificate (such as a public key 63 encrypted by a secret key of the certificate authority), and returns this public key certificate to the sub-processor 33, and the respective sub-processors 33 hold the public key certificate. Similarly, based on the public key of the respective peer nodes 84, the public key certificate authority issues a public key certificate, and returns this public key certificate to the peer nodes 84, and the respective peer nodes 84 hold the public key certificate. It should be noted that, as the public key certificate, X.509, which was recommended by the ITU-T, may be employed.

Figure 5:
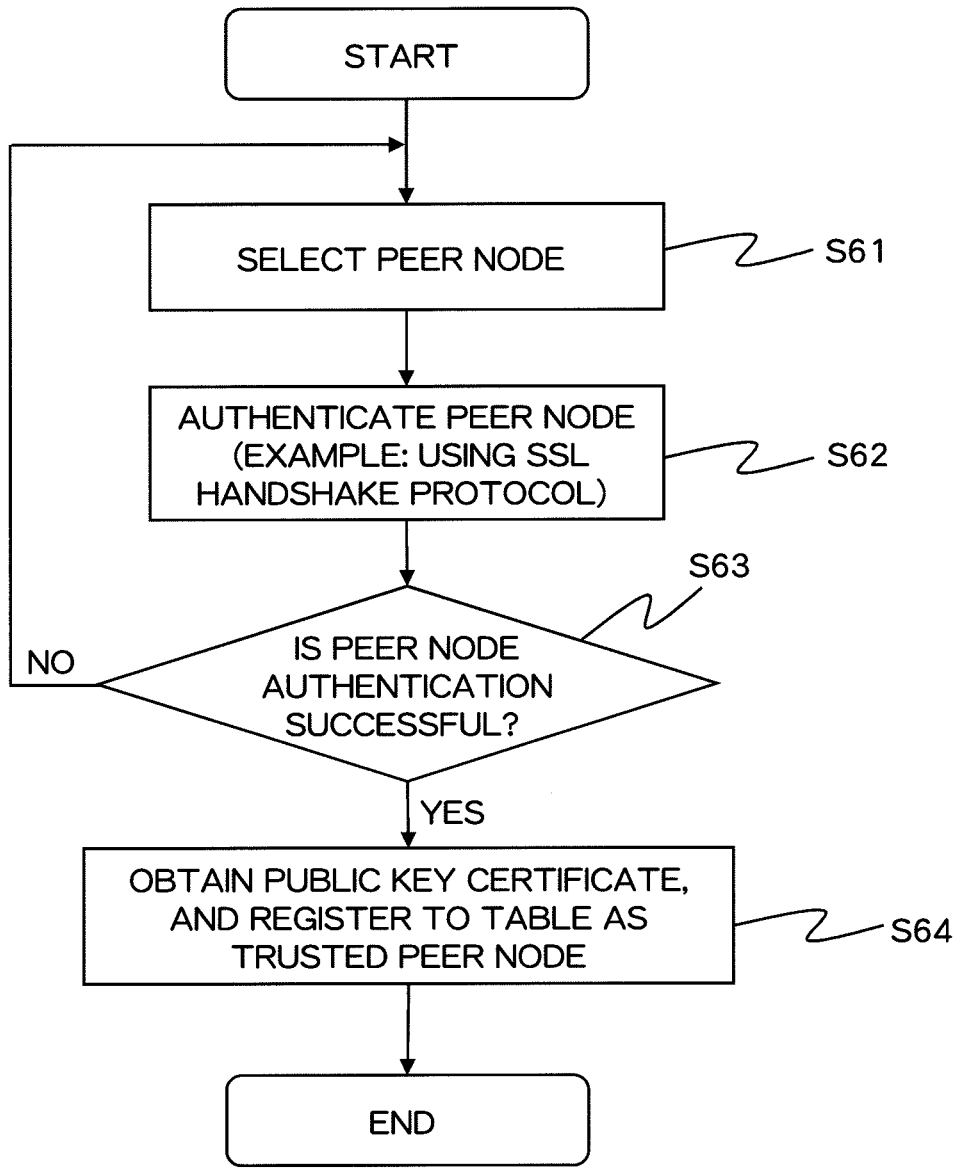
FIG. 5 is a flowchart for a peer node selection/authentication/registration process.

As shown in FIG. 5, when each of the sub-processors 33 is to establish a trust relationship with a peer node 84, the sub-processor 33, first in a step S61, carries out a selection process of an external peer node 84. On this occasion, a peer node selection server is present on the network 85, which is not illustrated. The peer node selection server, based on the request of the respective sub-processors 33, uniquely selects one peer node 84, and the sub-processor 33 carries out a mutual authentication using the SSL handshake protocol or the like in a step S62 with the selected peer node 84. For example, the sub-processor 33 receives the public key certificate from the selected peer node 84, decrypts this public key certificate using the public key of the public key certificate authority, and obtains information on the peer node 84 (such as the public key of the peer node 84 and the name of an administrator thereof). Then, based on this information, the sub-processor 33 authenticates the peer node 84. Similarly, the peer node 84 receives the public key certificate from the sub-processor 33, decrypts this public key certificate using the public key of the public key certificate authority, and obtains information on the sub-processor 33 (such as the public key of the sub-processor 33 and the name of a user thereof). Then, based on this information, the peer node 84 authenticates the sub-processor 33. Then, if it is determined that the mutual authentication is successful in a step S63, subsequently, the sub-processor 33 determines that the peer node 84 is a trusted peer node as long as such a failure that the access thereto is not available does not occur. Therefore, in a step S64, the sub-processor 33 registers information relating to this peer node 84 to the peer node access table 65 shown in FIGS. 3A and 3B. On the other hand, the mutual authentication fails in the step S63, the sub-processor returns to the step S61 again, and the sub-processor 33 asks again the peer node selection server for selection of a peer node. If the mutual authentication has not been successful eventually (until a predetermined period has elapsed), the sub-processor 33 determines that there is no peer node which can be trusted. In this case, according to this embodiment, the sub-processor 33 does not get involved (participate) in the distributed processing for the search process. The above process may be carried out when a client requests for the search, or on other proper timing such as a startup of the computer 31.

Figure 6:
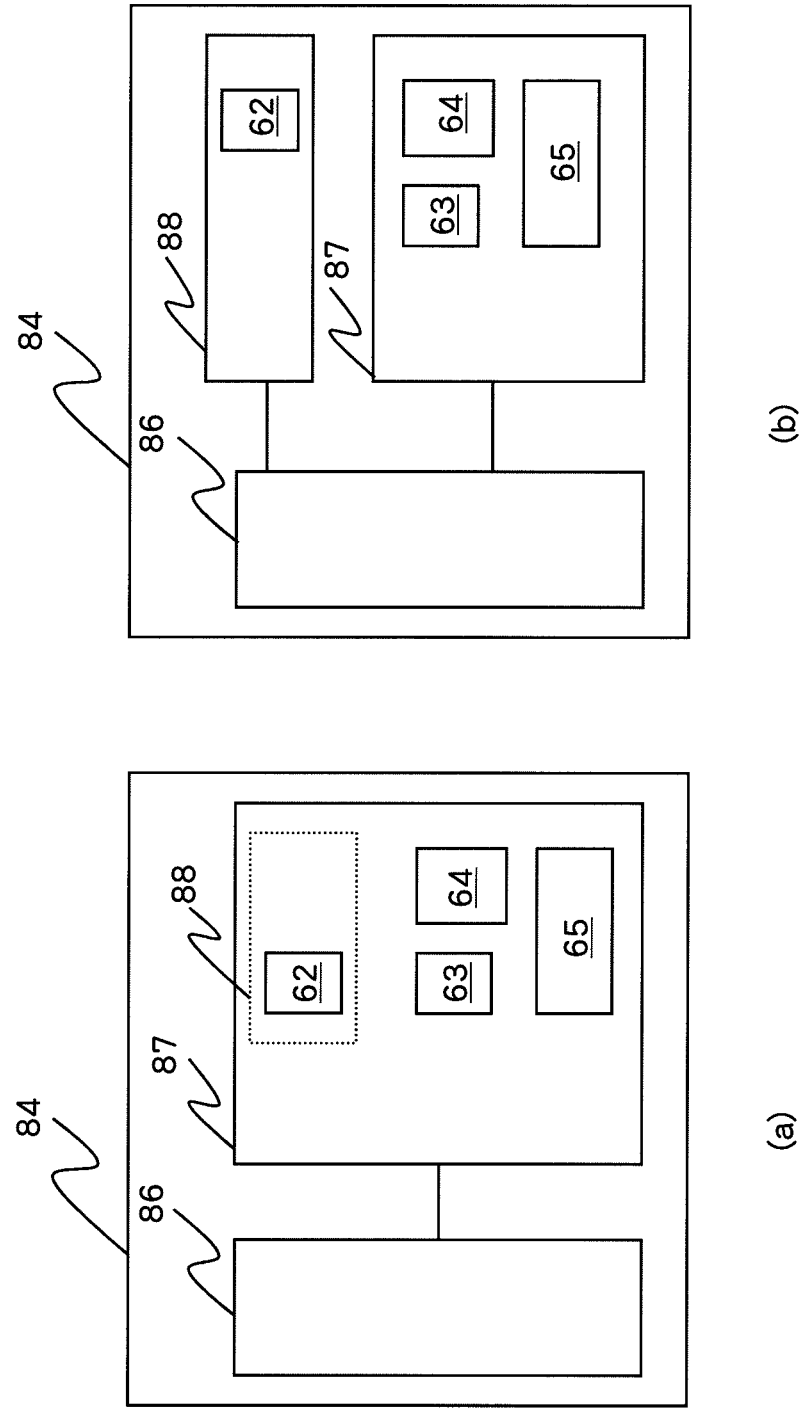
FIGS. 6A and 6B show configuration examples of the peer node.

The peer nodes 84 shown in FIG. 4 may be configured as the computer 31 configured shown in FIG. 2, or may be a general-purpose or a dedicated computer which has a secure memory 88 inside a main memory 87 accessed by a main processor 86, or has the secure memory 88 independently of the main memory 87 as shown in FIGS. 6A and 6B. If the peer node 84 employs the configuration shown in FIGS. 6A and 6B, the secure memory 88 stores a secret key 62, and the main memory 86 stores a public key 63, a public key certificate 64 issued by a third party, and the peer node access table 65. If the computer 31 shown in FIG. 4 serves as a peer node having a single processor, the computer 31 may be configured such that the main processor 42 is the main processor 86 in FIGS. 6A and 6B, and the main memory 47 in FIG. 4 is the main memory 87 in FIGS. 6A and 6B. In other words, the main memory 47 includes a storage area corresponding to the secure memory 88 shown in FIG. 6A, stores the secret key 62 therein, and further stores the public key 63 and the public key certificate 64 in other storage area. If the computer 31 serves as a peer node having a single processor and the main processor 42 is not involved in the search process, the computer 31 does not have to store a peer node access table 65.

Figure 7:
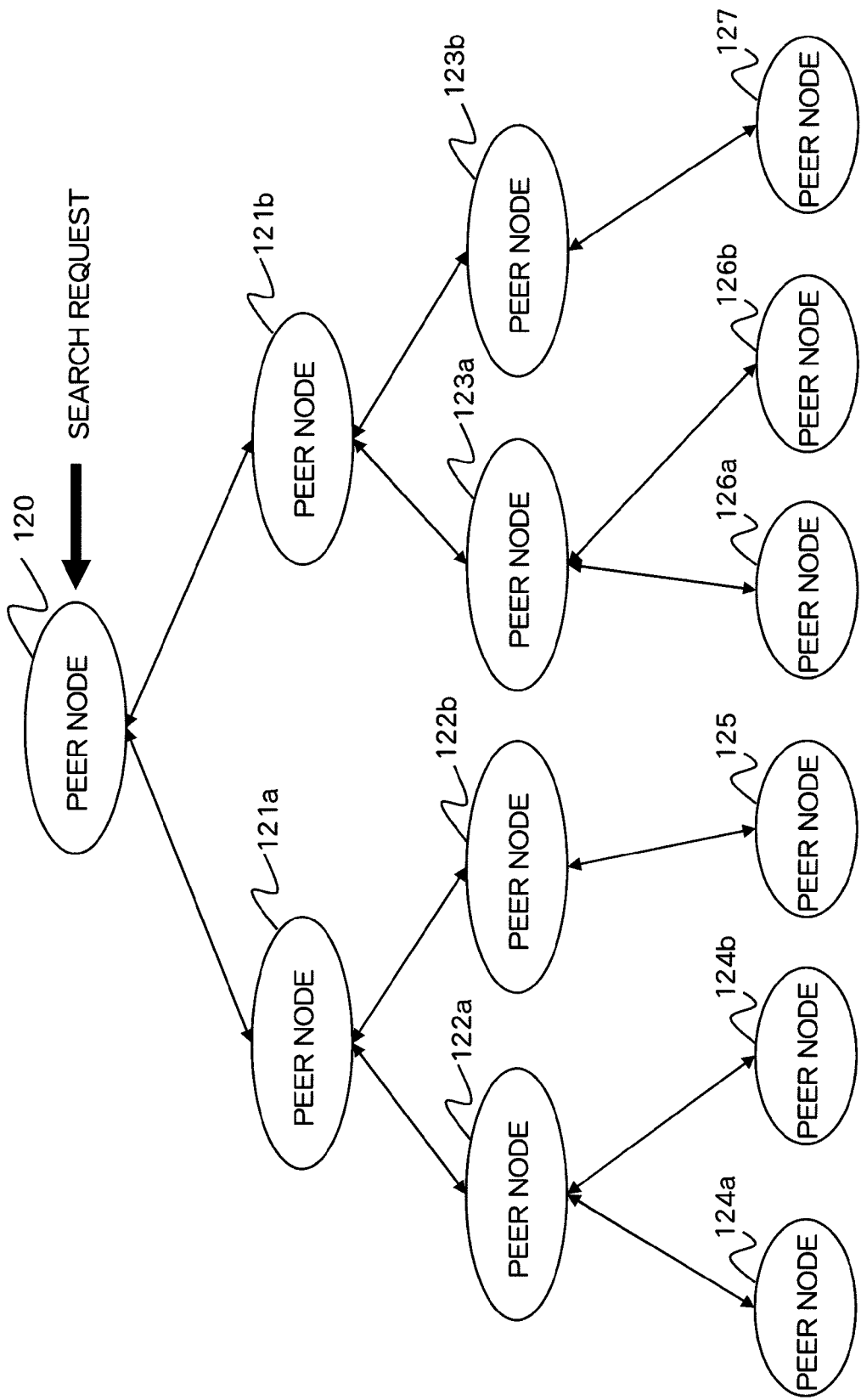
FIG. 7 shows an example of a trust relationship between peer nodes contained in the data communication system according to this embodiment.

In the above-described embodiment, it is assumed that one sub-processor establishes a trust relationship with only one peer node. However, one sub-processor may have trust relationships with multiple peer nodes, and requests them for search. Moreover, as shown in FIG. 7, multiple peer nodes may be configured into a tree-structure network of the peer nodes with a peer node 120, as a top, which receives a search request. For example, the peer node 120, which initially receives the search request, has established trust relationships with two peer nodes 121a and 121b, and, in turn, the peer node 121a has established trust relationships with peer nodes 122a and 122b. Again, the respective peer nodes may be a computer system employing one-chip multi-core processors as shown in FIG. 2, or other computer systems.

In the trust relationship network as shown in FIG. 7, when the peer node 120 receives a search request from a client, the search request propagates downward (toward ends of the tree), and peer nodes 124a, 124b, 125, 126a, 126b, and 127 located at terminals of the trust relationship return search results upward (toward the root of the tree). Finally, the search results of all the peer nodes are collected at the peer node 120 which has initially received the search request from the client. The client, not shown, which has requested the peer node 120 for the search receives these search results, and shows them to a user. If the peer node 120 is a search server having its own user interface, the peer node 120 instantly shows the search results to the user via a user interface.

Figure 8:
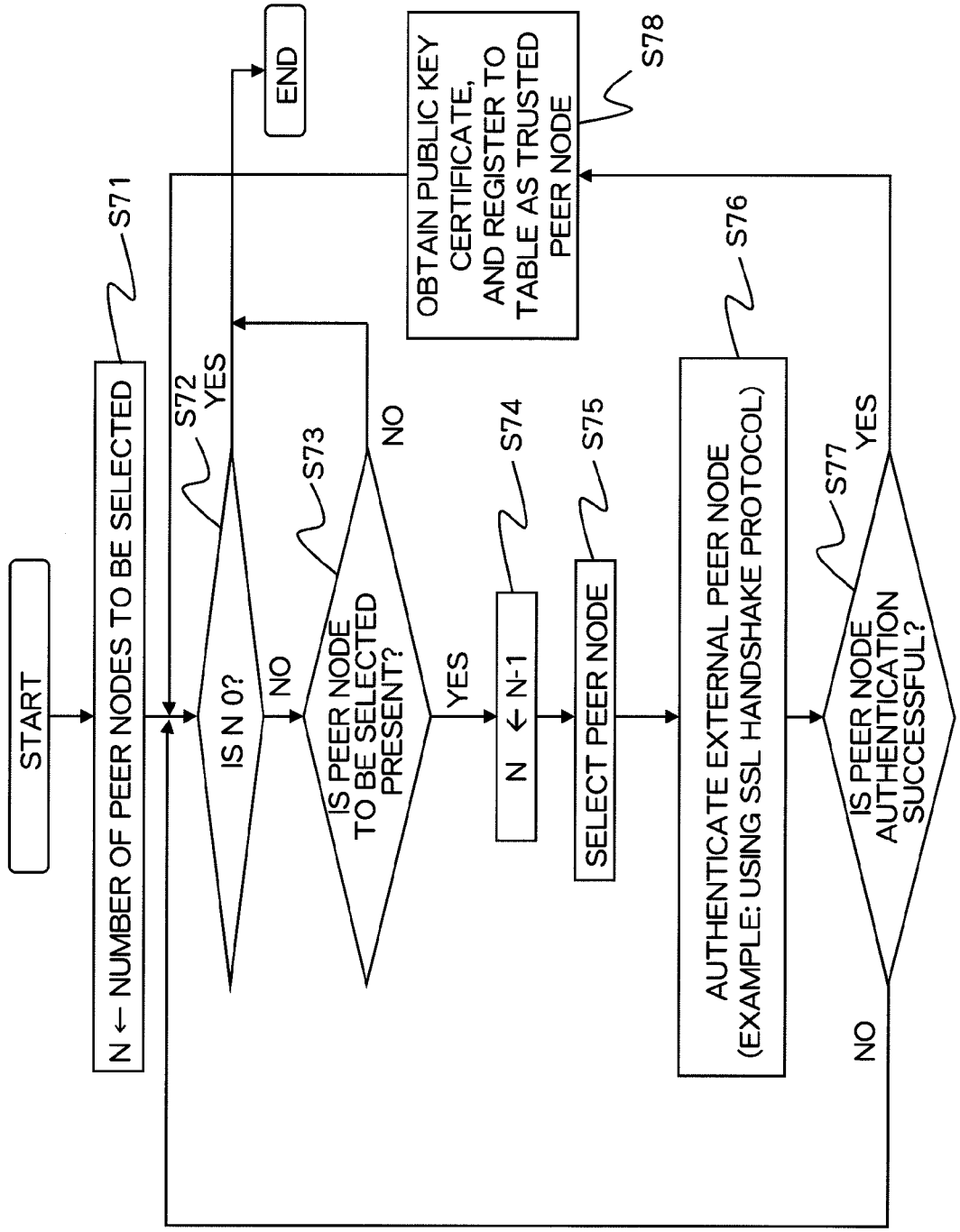
FIG. 8 is a flowchart for the peer node selection/authentication/registration process for a case where one sub-processor carries out authentication with multiple peer nodes.

In order to realize the embodiment shown in FIG. 7, it is necessary to extend the registration process, which is shown as the flowchart in FIG. 5, and is carried out by the respective sub-processors to register a peer node with which a trust relationship has been established, to a more general process. This is shown in FIG. 8. In this flowchart, first in a step S71, a sub-processor 33 determines how many peer nodes are to be selected (how many peer nodes which the sub-processor 33 tries to establish a mutual authentication with). Of course, if the number N of the peer nodes to be selected is one, the process in FIG. 8 is substantially the same as the process in FIG. 5. Moreover, N may be infinitely large. However, in practice, the peer node access table 65 shown in FIGS. 3A, 3B, 6A, and 6B is generally finite.

First, in a step S72, the sub-processor 33 determines whether N is zero or not, namely, whether the authentication has been carried out for the predetermined N peer nodes. If N is not zero, the sub-processor 33 proceeds to a step S73, and checks whether there is a peer node to be selected. As a result, if there is a peer node to be selected, the sub-processor 33 decreases N by one in a step S74, and then, proceeds to a step S75 to select a peer node. If there is no longer a peer node to be selected, the sub-processor 33 finishes the registration process. In a step S76, the sub-processor 33 carries out the mutual authentication with the peer node selected in the step S75. For the mutual authentication, the SSL handshake protocol can be used, for example. Finally, in a step S77, the sub-processor 33 determines whether the peer node authentication is successful, and if the authentication is successful, the sub-processor 33 proceeds to a step S78, obtains the public key certificate from the peer node with which the authentication is successful, and registers the peer node as a trusted peer node to the peer node access table. If the peer node authentication fails, the sub-processor 33 returns to the step S72 without registration.

FIG. 9 shows an example of the peer node access table 65 in FIGS. 3A and 3B or FIGS. 6A and 6B. On this table, there are a peer node ID (in this example, not a global ID, but a local ID with respect to a computer owning this table is shown), a public key certificate storage location, which is an address on a local memory, an IP address of a registered peer node, and a response, which indicates the registered peer node is presently accessible, as fields. This embodiment uses an IP address, but an address which shows in some form a location of the other party on a network, such as a MAC address may be used. "OK" in the Response field indicates an accessible peer node, and "NO" in the Response field indicates an inaccessible peer node for whatever reason (such as a disconnection of a network, or a disconnection of a power supply of a computer).

Figure 10:
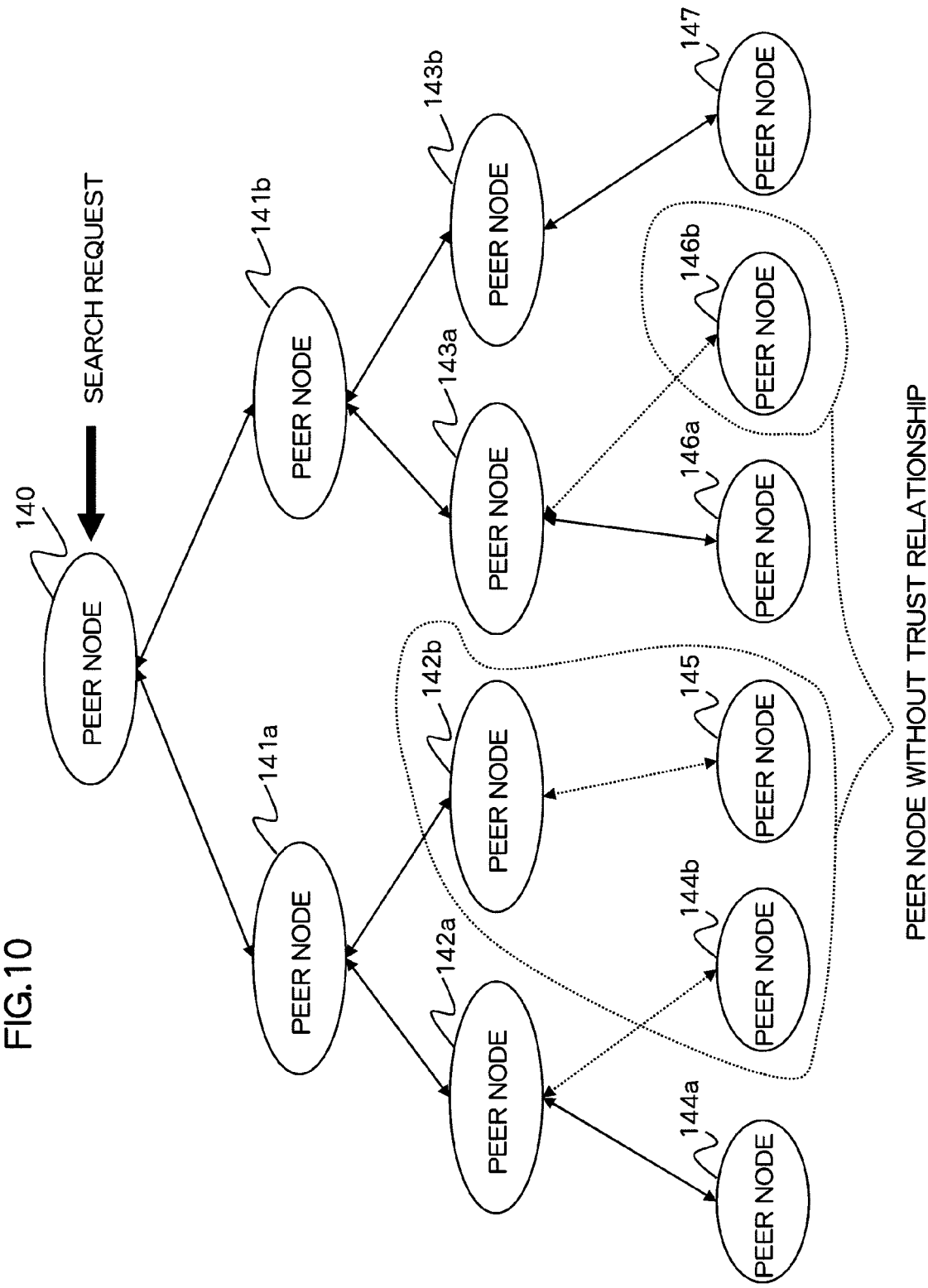
FIG. 10 shows another example of the trust relationship between the peer nodes contained in the data communication system according to this embodiment.

In the above description, it is assumed that trust relationships are established only between a sub-processor which requests a search, and all peer nodes which are requested for the search. However, in practice, such a strict restriction may not be necessary, and as long as a search result can be clearly distinguished between one obtained from a peer node which is trusted and one obtained from a peer node which is not trusted, it is conceivable to employ a method where a user uses the search results in his or her own risk. For example, in FIG. 10, peer nodes, which each process a part of a search request, include peer nodes which are not trusted. FIG. 10 is different from FIG. 7 in that nodes of a tree-structure network include peer nodes which are not trusted. Peer nodes 142b, 144b, 145, and 146b are peer nodes with which a trust relationship cannot be established. These nodes are peer nodes which do not have a public key certificate issued by a third party, for example. Therefore, the peer node 142b is a peer node which is not trusted by a peer node 141a, and the peer node 141a recognizes that a search result from this peer node 142b is not trusted. The same applies to relationships between a peer node 142a and the peer node 144b, and between a peer node 143a and the peer node 146b. What needs a special attention is that, if a certain node is not trusted, search results from all nodes connected (below with respect to this node) to this node are recognized as search results which are not trusted. For example, even if the peer node 145 holds a public key certificate issued by a third party, if information provided by this node 145 routes through the peer node 142b, which is not trusted, the peer node 142b recognizes the information as a search result which is not trusted. This is because, if a node which is not trusted is interposed, information may be modified on this node which is not trusted.

Figure 11:
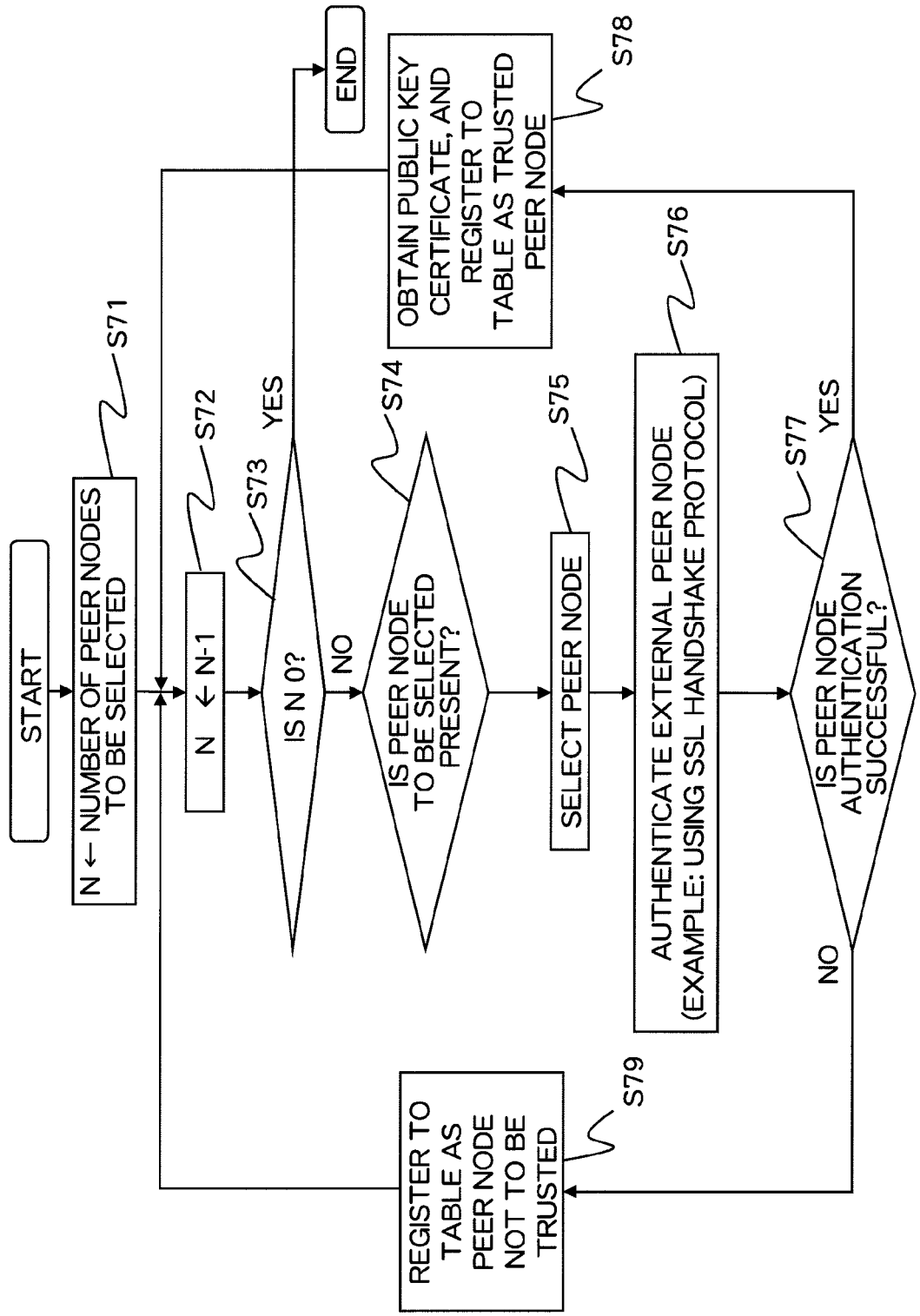
FIG. 11 is a flowchart for the peer node selection/authentication/registration process for a case where one sub-processor carries out authentication with multiple peer nodes, and requests a peer node, to which a trust relationship is not established, for search.

FIG. 11 is a flowchart showing the registration process of peer nodes for a case where one sub-processor carries out authentication with multiple peer nodes, and the peer nodes partially include peer nodes with which a trust relationship has not been established. The process shown in this flowchart assumes the tree-structure network in FIG. 10, and is a process obtained by modifying the flowchart shown in FIG. 8. Specifically, what is different from FIG. 8 is a process subsequent to the step S77. In FIG. 8, if the peer node authentication fails, the sub-processor 33 does not carry out any processes. However, as shown in FIG. 10, in order to issue the search request to peer nodes which are not trusted, in FIG. 11, a step S79 is added as a process to be carried out after the peer node authentication fails. In other words, if the mutual authentication with a certain peer node fails, this peer node is registered to the peer node access table as a peer node with which a trust relationship is not established.

Figure 12:
FIG. 12 is a configuration example of the peer node access table for the case where one sub-processor carries out authentication with multiple peer nodes, and requests a peer node, to which a trust relationship is not established, for search.

FIG. 12 shows an example of the peer node access table generated by the process shown in FIG. 11. The peer node access table in FIG. 11 is obtained by adding a field of "RELIABILITY" to the peer node access table shown in FIG. 9. In this table, the reliability field corresponding to the peer node ID 0004 is "ABSENT". This indicates that, for this peer node, it is determined that the peer node authentication fails in the step S77, namely, this peer node is not trusted. Moreover, the public key certificate storage location corresponding to the peer node ID 0004 indicates "NONE". This is because a peer node which is not trusted does not hold a public key certificate, and cannot be stored in the local memory.

Figure 13:
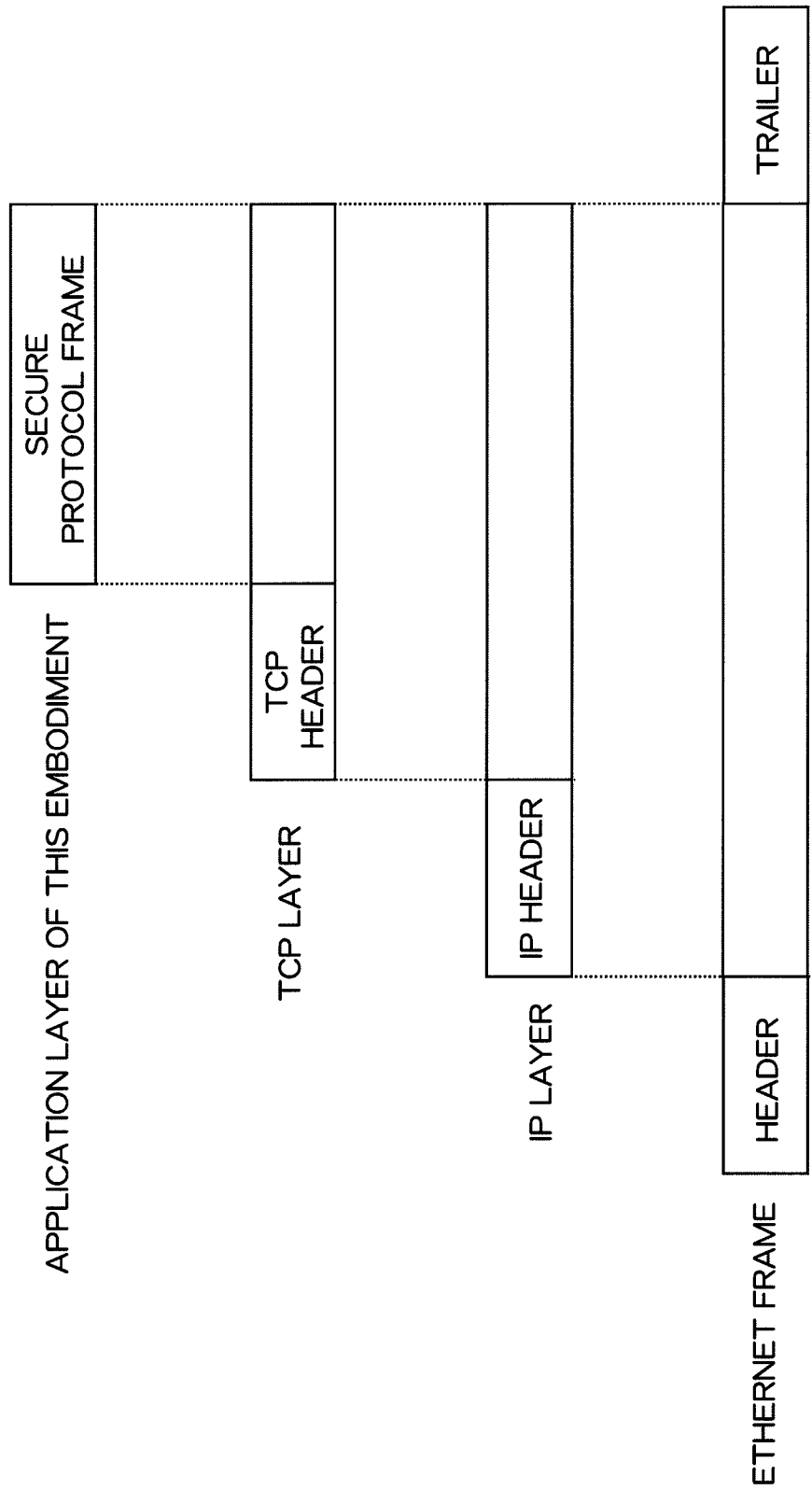
FIG. 13 shows a position of a secure protocol frame in an overall communication protocol according to this embodiment.

Referring to FIGS. 13 to 19, a more detailed description will now be given of the data communication method according to this embodiment. As shown in FIG. 1, the communication protocol according to this embodiment, on the Internet Protocol, for example, is located on the transport layer (such as the TCP). FIG. 13 shows an example where the communication layers of this embodiment are built employing the TCP/IP. In other words, a data structure used in the communication protocol according to this embodiment is shown as a secure protocol frame in FIG. 13. According to the TCP/IP, the TCP header and the IP header are added to this secure protocol frame. An Ethernet (registered trademark) frame sent out to the network 85 further includes a header and a trailer added before and after this data.

Figure 14:
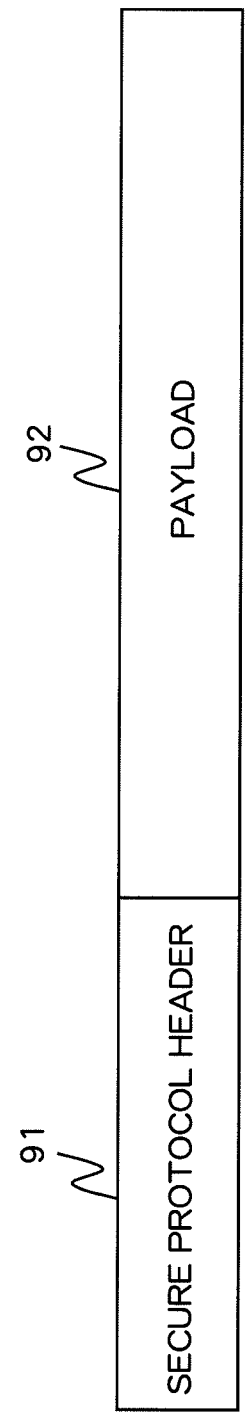
FIG. 14 is a configuration diagram of the secure protocol frame according to this embodiment.
Figure 15:
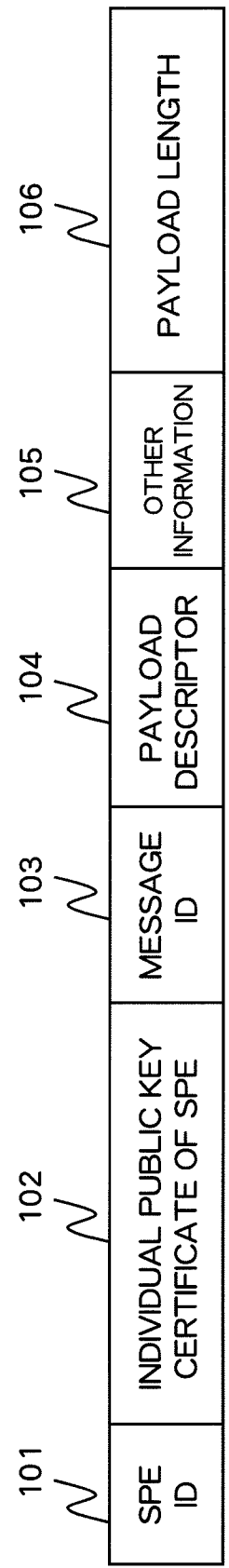
FIG. 15 is a configuration example of a secure protocol header according to this embodiment.

FIG. 14 shows a secure protocol frame structure according to this embodiment, and, as shown in FIG. 14, the secure protocol frame is constructed by a secure protocol header 91 and a payload (namely, communication content) 92. FIG. 15 describes an example of the secure protocol header 91 in more detail. In this example, the secure protocol header 91 includes an SPE ID 101, which is an ID of a sub-processor 33 sending out the payload 92, an individual public key certificate 102 uniquely and individually held by the sub-processor 33, a message ID 103 uniquely identifying an individual message, a payload descriptor 104 indicating a type of the content of the payload 92, a payload length 106, and other information (which varies depending on the application form) 105. The payload descriptor, in this example, is 0x01 when the payload 92 includes a task request, and is 0x02 when the payload 92 includes a result of a task request.

Figure 16:
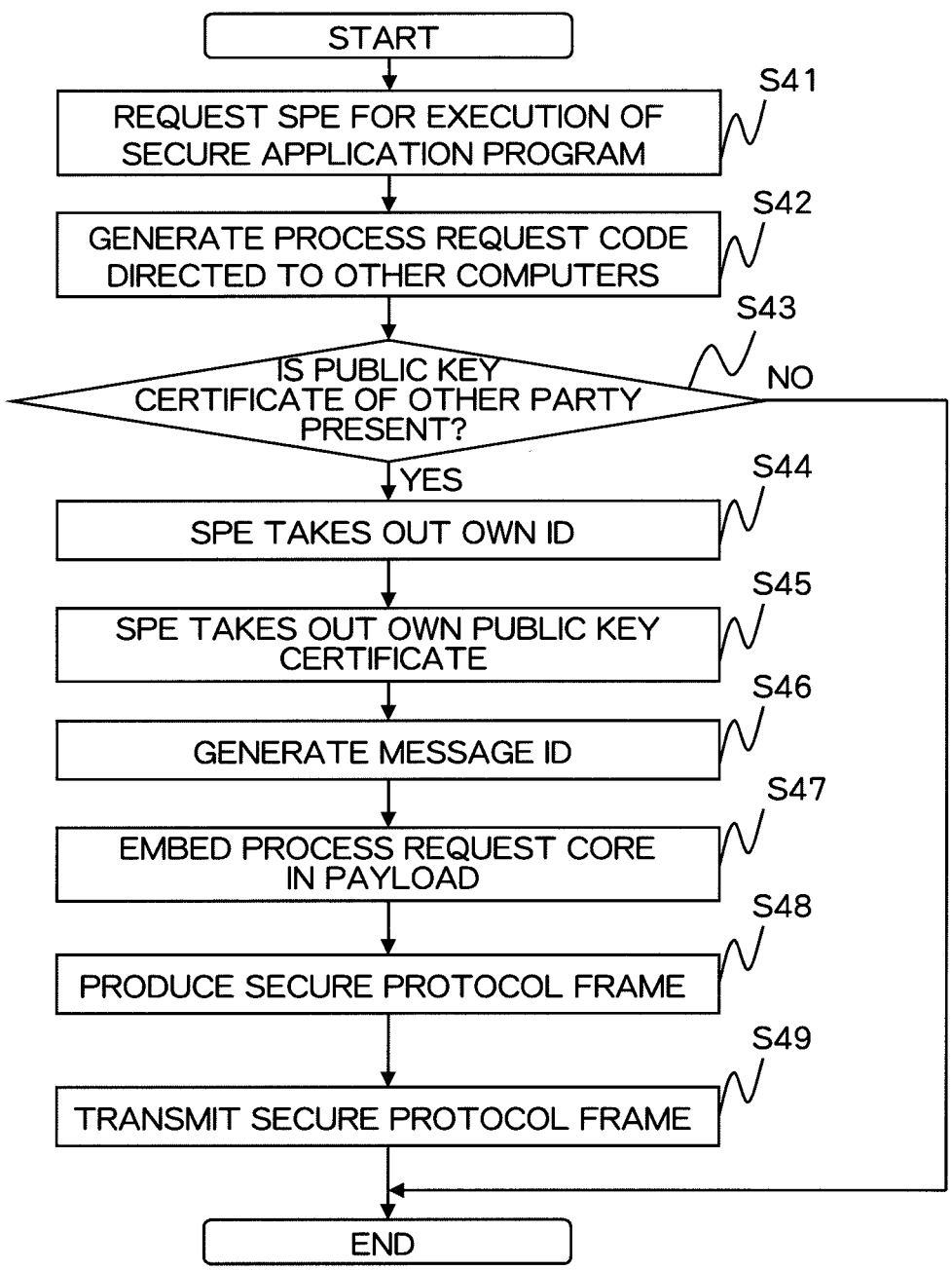
FIG. 16 is a flowchart showing a process, when a peer node is specified, for requesting the specified peer node for processing.
Figure 17:
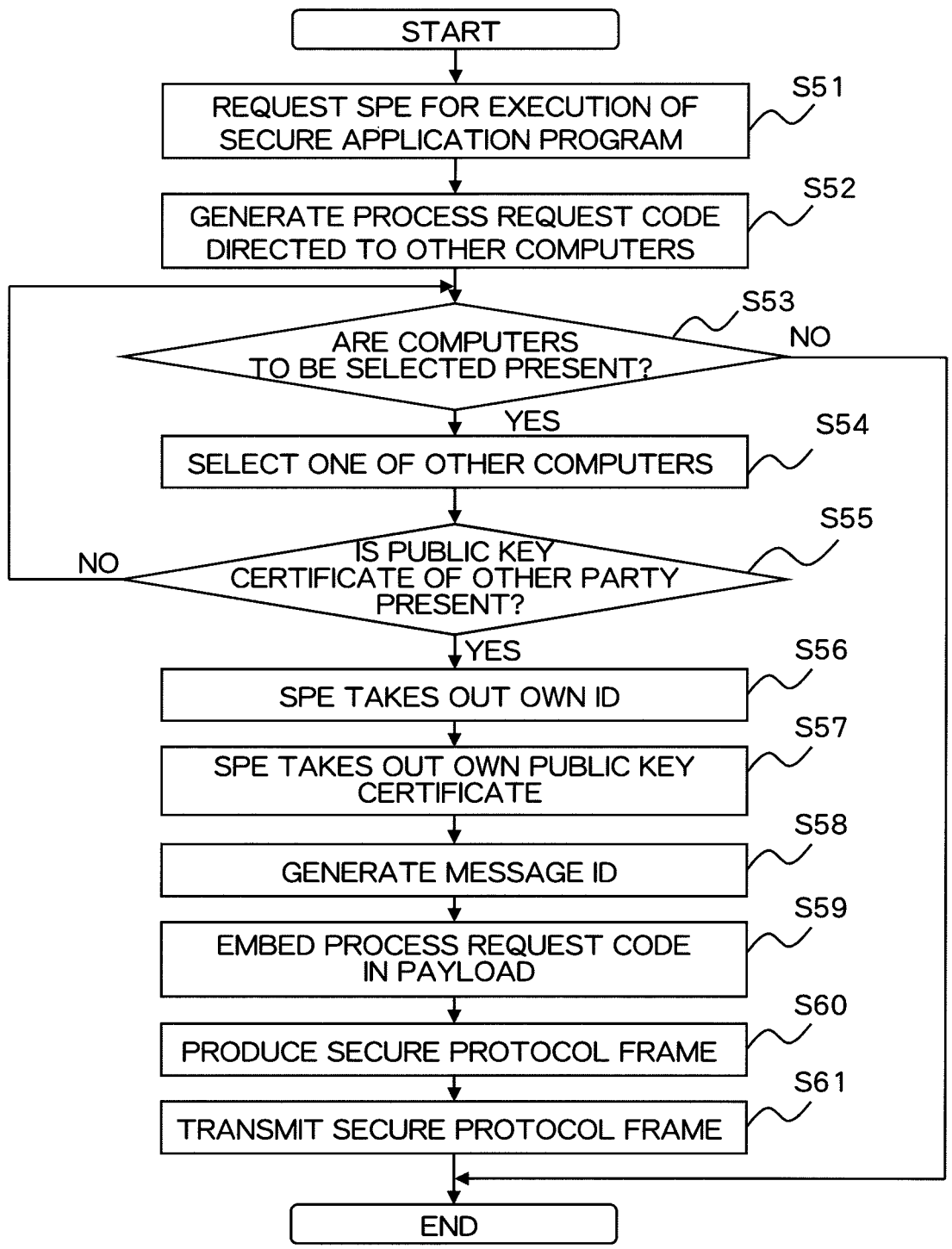
FIG. 17 is a flowchart showing a process, when a peer node is not specified, for requesting any peer node for processing.

FIGS. 16 and 17 show two cases in a data transmission process, which are each a case where a peer node which receives data is especially specified (FIG. 16), and a case where a peer node is not especially specified and any peer node which can respond may receive the data (FIG. 17).

In FIG. 16, in a step S41, an execution request of a secure application program is issued to a sub-processor 33. The secure application programs include a startup application program for a search application program, and an application program for relocation request of objects (application programs and data) between peer nodes. Then, in a step S42, the sub-processor 33 generates a process request code directed to other computer (peer node). The process request code is data indicating a search request accompanying keywords in case of the application program relating to the search, or data requesting for a conditioned relocation of an object from a specific node to another node in case of the application program for the object relocation.

Figure 3:
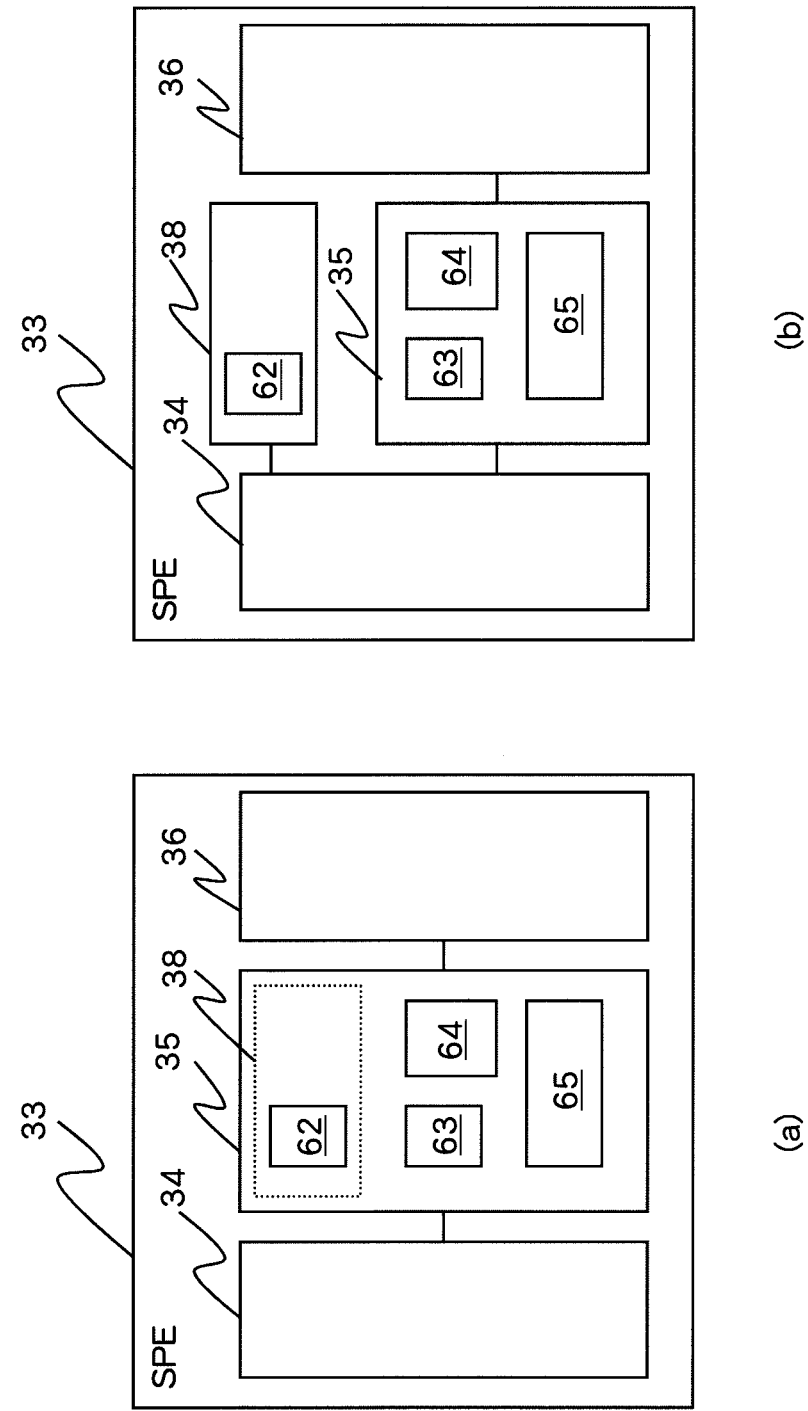
FIGS. 3A and 3B show configuration examples of a sub-processor provided for the computer shown in FIG. 1.

Then, in the following step S43, the sub-processor 33 determines whether a public key certificate of the destination peer node is registered to the peer node access table 65 shown in FIG. 3. If a public key certificate is registered, the sub-processor 33 determines the peer node is a trusted node, and, in a step S44, the sub-processor 33 reads out a SPE ID which identifies this sub-processor 33 from the local storage 35 of this sub-processor 33, for example. Moreover, in a step S45, the sub-processor 33 reads out a public key certificate 64 shown in FIG. 3 from the local storage 35, for example, and generates a message ID in a step S46. The message ID may be serially generated, or may be generated based on a random number. The message ID is stored in the local storage 35, for example, until a secure protocol frame in response to the transmission of the secure protocol frame is returned from the peer node which is the other party of the communication.

In a step S47, the sub-processor 33 generates data for a payload 92 including the process request code generated in the step S42, produces a secure protocol frame in a step S48, and transmits the secure protocol frame to the other computer specified in advance in a step S49. The secure protocol frame is data containing, in the secure protocol header 91, the SPE ID read out in the step S44, the public key certificate read out in the step S45, and the message ID generated in the step S46, and containing, in the payload 92, the process request code generated in the step S42.

If, in the step S43, the sub-processor 33 determines that a public key certificate of the peer node of the other party (other computer) is not registered to the peer node access table 65, the sub-processor 33 determines that the condition for executing the secure application program is not satisfied, and finishes the process.

On the other hand, FIG. 17 shows the process for the case where a computer as the other party of the communication is not specified. One of differences between FIG. 17 and FIG. 16 is that steps S53 and S54 are inserted between the steps S42 and S43 of FIG. 16, and in the step S53, if the sub-processor 33 determines that at least one computer which can be selected as the other party of the communication exists, the sub-processor 33 selects one computer (peer node) in the step S54. Computers which can be selected as the other party of the communication may be stored as a list in advance. A second difference is that, in FIG. 16, in the step S43, the sub-processor 33 immediately finishes the process if a public key certificate of the other party is not present, but in FIG. 17, in a step S55, even if a public key certificate of the other part is not present, the sub-processor 33 continues the process as long as computers which can be selected as the other party of the communication exist in a step S53. The other part of the process is the same, and hence description thereof is omitted.

The peer node (computer) which has received the secure protocol frame (received secure protocol frame) transmitted as described above generates a secure protocol frame (reply secure protocol frame) containing data indicating a process result, and returns this reply secure protocol frame to the original computer 31. On this occasion, if the peer node of the other party cannot determine that the computer 31 of the transmission source is valid according to the public key certificate contained in the secure protocol header 91 of the received secure protocol frame, the peer node does not return a secure protocol frame. Moreover, the reply secure protocol frame also contains data indicating results of various processes such as search results in the payload 92. Moreover, in the field of the SPE ID 101 of the secure protocol header 91, the value of the SPE ID contained in the secure protocol header 91 of the received secure protocol frame is stored. Further, in the field of the individual public key certificate of the SPE 102, the public key certificate of this peer node, which has received the process request, is stored. Moreover, in the field of the message ID 103, the value of the message ID contained in the secure protocol header 91 of the received secure protocol frame is stored. Moreover, in the field of the payload descriptor 104, data indicating a reply of the process result, for example, is stored.

Figure 18:
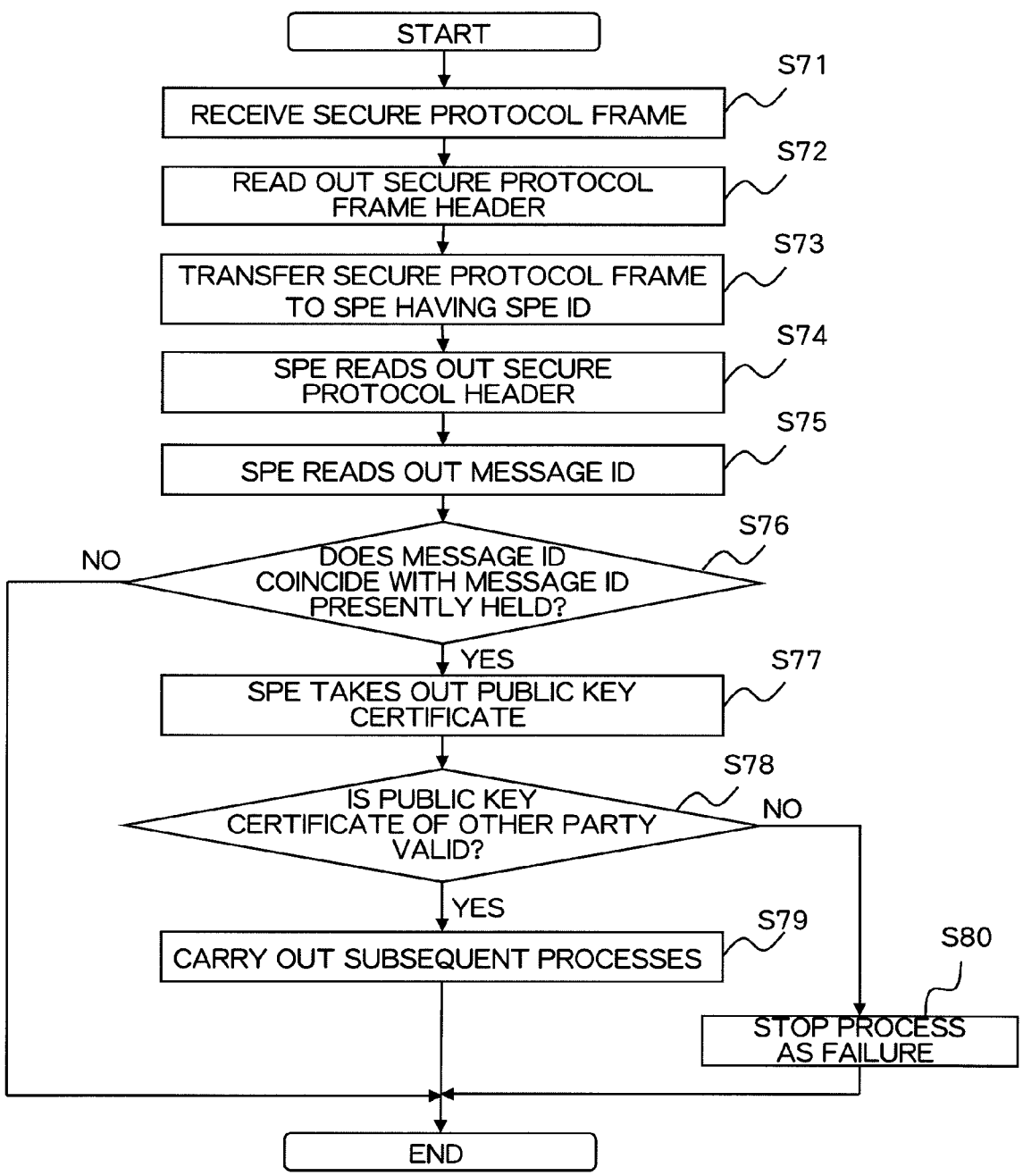
FIG. 18 is a flowchart showing a process carried out when a computer, which has requested the peer node for processing, receives a secure protocol frame returned from the peer node.

FIG. 18 is a flowchart showing a process for a case where the computer 31, which has transmitted the secure protocol frame as a result of the process in FIG. 16 or FIG. 17, receives the reply secure protocol frame from the computer (peer node) of the transmission destination.

First, in a step S71, when the computer 31 receives the secure protocol frame, in a step S72, the main processor 39, for example, reads out the secure protocol header 91. Then, in a step S73, the communication processor such as the main processor 39 reads out the SPE ID contained in the secure protocol header 91 read out in the step S72, and transfers the secure protocol frame to the sub-processor 33 containing this ID via the bus 45.

A process of the step S74 and the following steps is a process executed by the sub-processor 33 which receives this secure protocol frame. First, in the step S74, the sub-processor 33 reads out the secure protocol header 91, and, in a step S75, reads out the message ID from this secure protocol header. In a step S76, the sub-processor 33 checks whether or not this message ID coincides with the message ID generated in the step S46 in FIG. 16 and stored in the local storage 35 or the like.

As a result of the check in the step S46, if the two message ID's coincide with each other, in the following step S77, the sub-processor 33 takes out the public key certificate from the secure protocol header 91. In a step S78, the sub-processor 33 determines whether the public key certificate of the computer of the source of the reply, which is taken out in the step S77, is valid. This process may be a process for only determining whether the public key certificate coincides with a public key certificate stored in the local storage 35 or the like in advance, or the sub-processor 33 may carry out a process for newly checking a signature of the public key certificate. As a result of the step S78, if the sub-processor 33 determines that the public key certificate of the other party is valid, in a step S79, the sub-processor 33 carries out subsequent processes (such as display of a result of a search or of a relocation, or a request for reprocessing). If, in a step S78, the sub-processor 33 determines that the public key certificate of the other party is invalid, the sub-processor 33 proceeds to a step S80, and stops the process as a process failure. In this case, the process in the step S79 is not carried out (restricted).

Moreover, in the step S76, if the sub-processor 33 determines that the two message ID's do not coincide with each other, the sub-processor 33 simply finishes the process. After the sub-processor 33 has finished the process, the sub-processor 33 may wait for an arrival of a next secure protocol frame without a time limit, or finishes the process if a next secure protocol frame does not arrive in a certain period, for example.

Figure 19:
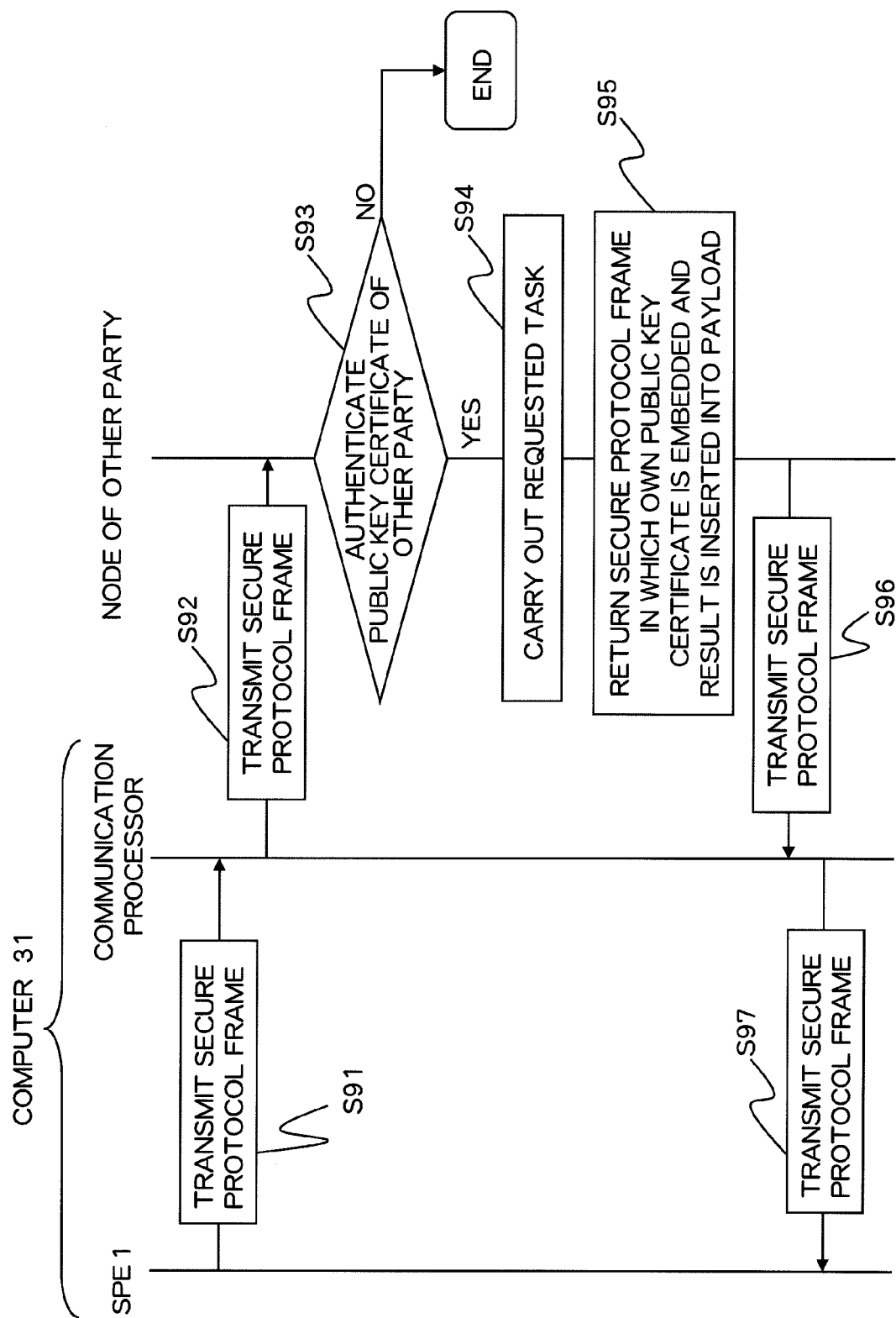
FIG. 19 is a sequence diagram showing a flow of processing of a task request/result reception process between a sub-processor (SPE) and a peer node.

FIG. 19 shows a flow of a process in which one of the sub-processors 33 selects a computer (peer node) as the other party, carries out a task request directed to the selected peer node according to FIGS. 16 and 17, and receives a result report. In steps S91 and S92, a secure protocol frame transmitted by the sub-processor 33 is transmitted to the node of the other party via the communication processor which processes the protocol stack. The peer node, which has received this secure protocol frame, takes out the public key certificate of the other party, and authenticates the other party (step S93).

As a result, if the authentication fails, the peer node finishes the process. If the authentication is successful, the peer node proceeds to a step S94, and carries out a requested task according to a payload 92. For example, if the requested task is a search, the peer node carries out the search process. If the task ends normally, the peer node produces a secure protocol frame in which a public key certificate of its own is embedded, and embeds a process result of the requested task in the payload 92. On this occasion, the peer node writes, for example, "0x02", which indicates a result, in the payload descriptor. In the secure protocol frame shown in FIG. 15, the peer node directly writes data of the secure protocol frame received in the step S92 in the SPE ID 101 and in the message ID 103. Then, in a step S96, the peer node transmits the secure protocol frame consequently produced to the computer having the IP address of the transmission source. This secure protocol frame is transferred to the sub-processor 33 of the request source via the communication processor of the computer of the request source according to FIG. 18 (step S97).

According to the above process, with the computer 31 provided with the one-chip multi-core processor 32, a secure data communication can be carried out on each of the sub-processors 33.

Figure 20:
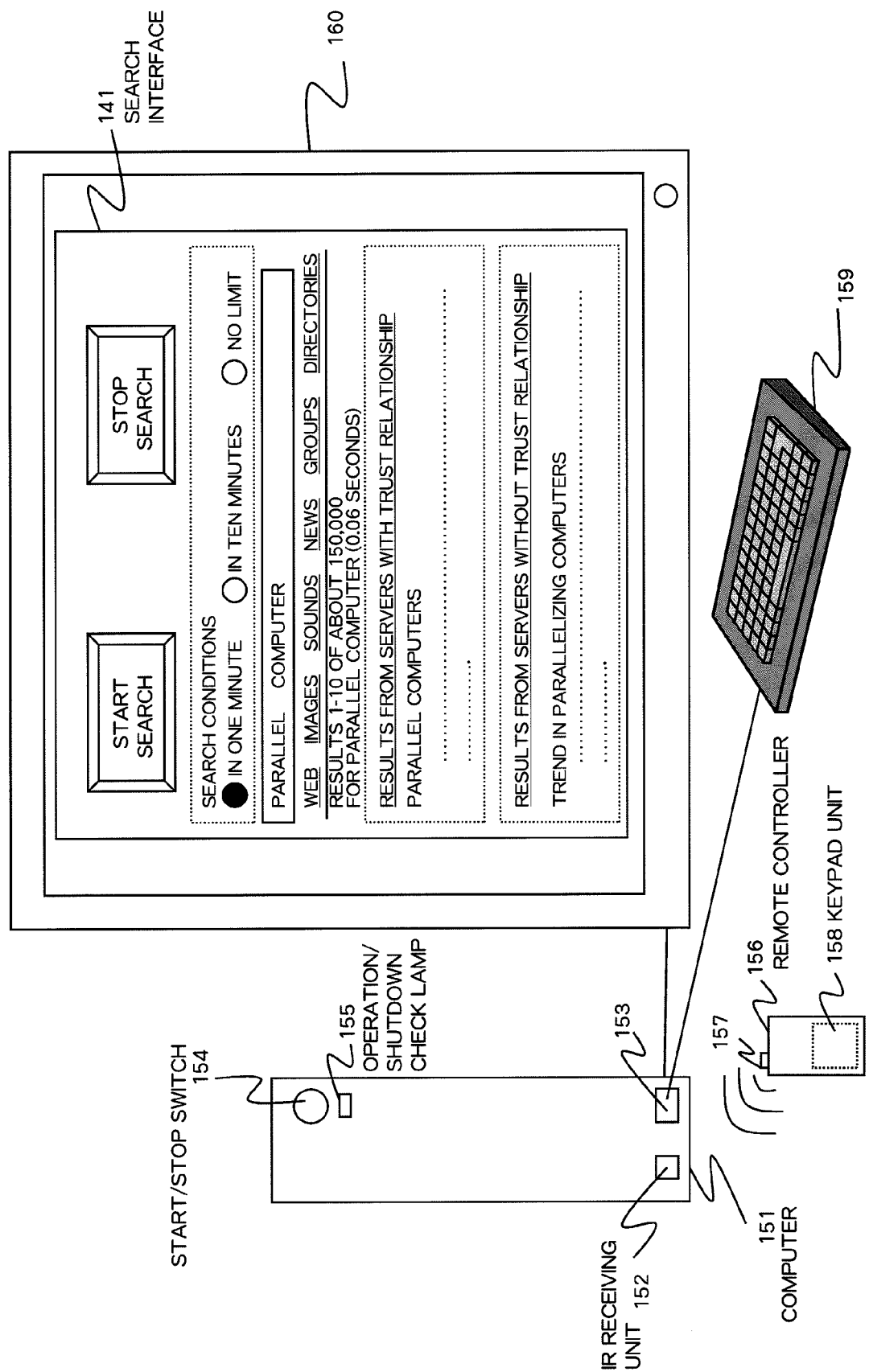
FIG. 20 shows a machine configuration example of a computer according to this embodiment.

It should be noted that the data communication method according to the embodiment may be used for a special-purpose computer such as a game machine in addition to a general-purpose computer. FIG. 20 shows an example of a system configuration of a computer employing the data communication method according to this embodiment. In this configuration example, a monitor 160 such as a television receiver is used, and a main unit of a computer 151 displays a search result by the monitor 160 or receives a search request. The computer 151 includes a switch 154 used to start and stop the device, a check lamp (indicator) 155 for indicating an operation state and a shutdown state, an IR reception unit 152 for receiving an infrared signal from a remote controller 156, and a connection interface 153 such as a USB used for connecting an input interface such as a keyboard 159. In this illustration, the keyboard 159 is connected to the connection interface 153 in a wired form apparently, but if the connection interface 153 is a wireless communication interface, the keyboard 159 may be a wireless keyboard as a matter of course, and may communicate with the connection interface 153 in a manner compliant with a communication standard such as IEEE 802.11a/b/g.

The remote controller 156 includes an infrared light emitting unit 157, and a keypad unit 158 provided with multiple numerical, character, and direction keys. The respective keys may be configured such that one key (input type selection key) is used to select an input type such as a numeric input, a character input, or a direction input. In this case, the one key is an input type selection key, and further, on the keypad unit, a display unit for displaying an input character is provided, and the display unit shows the input type (numeric, character, or direction) which is presently selected. Then, on this display unit, a string which has been input is also displayed. In another example, in place of the display unit, multiple lamps indicating the input types are provided, or one lamp which can illuminate in multiple colors is provided. As a result, this configuration indicates the input type. On the keypad unit 158, keys for character conversion or character selection are more preferably provided.

The inside of the computer 151 is configured as shown in FIG. 2, for example, is connected to the monitor 160 (corresponding to the monitor 57 in FIG. 2) via a graphic card 55, and is configured to display an output generated by a processor of a search intermediating device 151. Specifically, as shown in FIG. 19, a search interface 141 as shown in FIG. 18, for example, is displayed. Moreover, an operation directed to this search interface is carried out by means of the user interface such as the remote controller 156 or the keyboard 159. For example, by setting the input type to "Hiragana" using the remote controller 156, by entering hiragana characters with the keys on the keypad unit 158, and by properly converting the hiragana characters into Chinese characters and katakana characters, characters such as "parallel" in Chinese character or "computer" in katakana character may be typed in. Moreover, by setting the input type to "Direction" using the remote controller 156, and by instructing a direction with the keys on the keypad 158, a cursor may move from a button to a button on the search interface 141. For example, by depressing a right arrow key provided on the key pad unit 158, it is possible to change the cursor position in a sequence of a start search button, a stop search button, a search condition input section, a search input section, etc.

The invention claimed is:

1. A data communication method between a first computer and a second computer each including at least two processors, comprising:

a transmission step of transmitting, from the first computer to the second computer, data containing a processor ID identifying one of the at least two processors provided for the first computer and an address ID identifying the second computer;

a reply step of returning, from the second computer to the first computer, data containing the processor ID contained in the data transmitted in the transmission step, an address ID identifying the first computer, and a public key certificate relating to the second computer;

a reception step of, on the first computer, receiving the data returned from the second computer;

an acquisition step of, on the first computer, acquiring the processor ID contained in the data received in the reception step;

a processing step of, on the first computer, causing the processor, which is the one of the at least two processors provided for the first computer, and is identified by the processor ID acquired in the acquisition step, to process the data received in the reception step, the processing being restricted to the processor identified by the processor ID acquired in the acquisition step; and an authentication step of, on the first computer, restricting the processing in the processing step according to a content of the public key certificate contained in the data received in the reception step.

2. The data communication method according to claim 1, wherein:

the transmission step includes transmitting data further containing, in addition to the processor ID identifying the one of the at least two processors provided for the first computer, a public key certificate relating to the processor identified by the processor ID; and the reply step includes returning the data containing the processor ID contained in the data transmitted in the transmission step and the public key certificate relating to the second computer according to a content of the public key certificate contained in the data transmitted in the transmission step.

3. The data communication method according to claim 1, wherein the transmission step includes transmitting data, which contains the processor ID identifying the one of the at least two processors provided for the first computer as at least a part of a header, and a communication content as a payload, to the second computer.

4. The data communication method according to claim 1, wherein the reply step includes transmitting data, which contains the processor ID contained in the data transmitted in the transmission step and the public key certificate relating to the second computer as at least a part of a header, and a communication content as a payload, to the first computer.

5. A computer comprising:

at least two hardware processors;

data transmission means for transmitting data containing an address ID of another computer and a processor ID identifying one of the at least two processors to the another computer;

data reception means for receiving data containing an address ID of the computer, the processor ID identifying the one of the at least two processors, and a public key certificate from the another computer relating to the another computer;

processor ID acquisition means for acquiring the processor ID contained in the data received by the data reception means;

data processing means for causing the processor, which is the one of the at least two processors, and is identified by the processor ID acquired by the processor ID acquisition means, to process the data received by the data reception means, the processing being restricted to the processor identified by the processor ID acquired by the processor ID acquisition means; and authentication means for restricting the processing by the data processing means according to a content of the public key certificate contained in the data received by the data reception means.

6. A non-transitory information storing medium storing a program executed by a computer including at least two processors, the program controlling the computer to perform the steps of:

transmitting data containing an address ID of another computer and a processor ID identifying one of the at least two processors to the another computer;

receiving data containing an address ID of the computer, the processor ID identifying the one of the at least two processors, and a public key certificate from the another computer relating to the another computer;

acquiring the processor ID contained in the data received;

causing the processor, which is the one of the at least two processors, and is identified by the acquired processor ID, to process the data received during data reception, the processing being restricted to the processor identified by the acquired processor ID; and restricting the processing during data processing according to a content of the public key certificate contained in the data received.

* * * * *